Patented Jan. 11, 1938

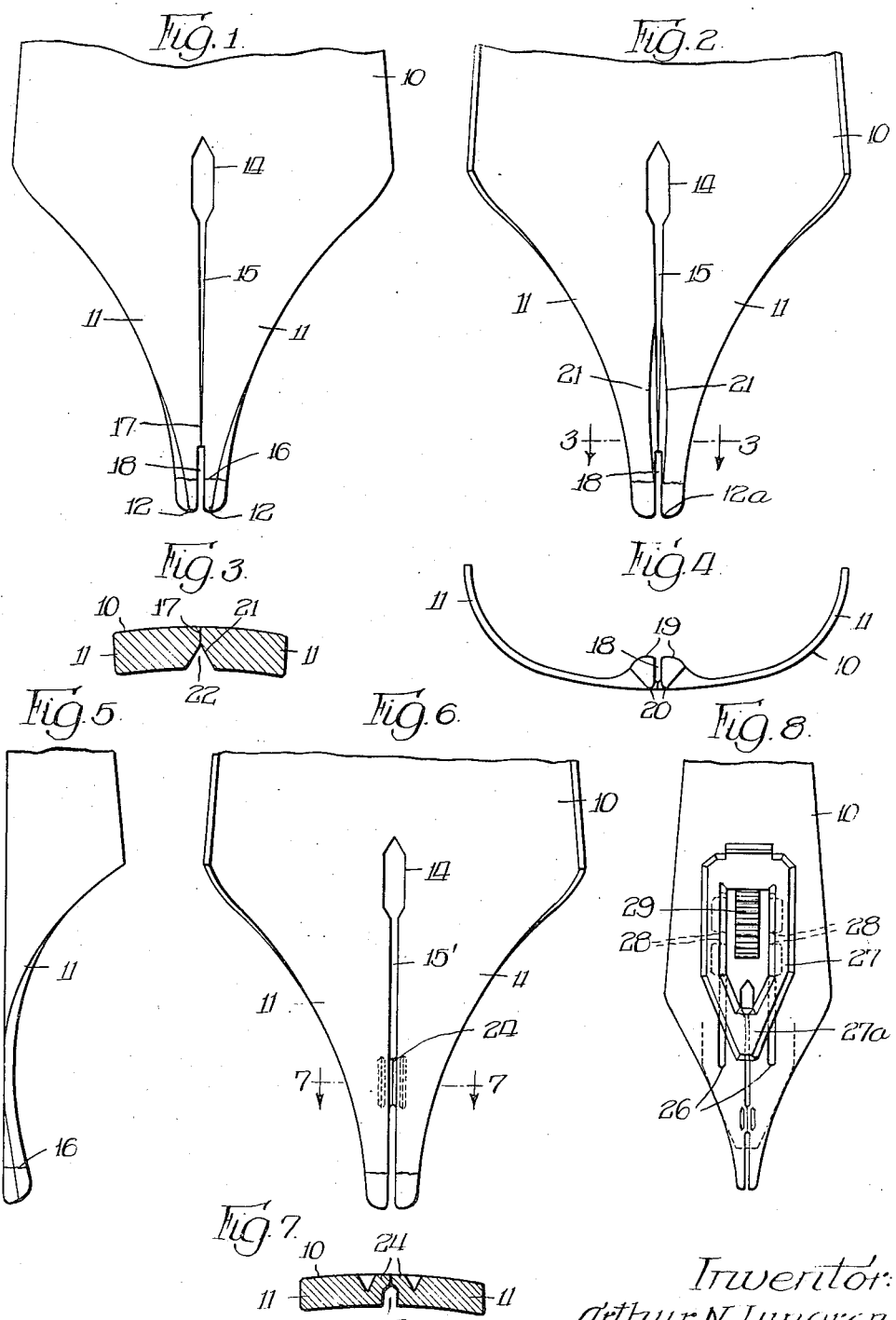

2,105,049

UNITED STATES PATENT OFFICE 2,105,049

PEN

Arthur N. Lungren, Evanston, Ill., assignor to The Wahl Company, Chicago, Ill., a corporation of Delaware Application October 19, 1935, Serial No. 45,716

10 Claims. (Cl. 120—109)

This invention relates to improvements in pens, and more particularly to improvements in pen points for fountain pens.

In order for a pen to start writing immediately it is applied to the paper, there must be ink at the extreme tip end portion of the pen point which touches the paper. In writing pens, the slit between the nibs of the pen point constitutes a channel for conducting ink to the tip and, if the pen point is properly "set" in a fountain pen, this slit may function to retain the necessary ink immediately at the tip. In order to function in this particular, it is necessary that the pen point be set with the tips of the nibs slightly spaced apart, in order to afford a crevice for retention of the ink. In fountain pens, such a set of the nibs is customarily accomplished by fixing the pen point in such relationship to the feed bar, which underlies it, that the nibs, by contact with the feed bar, are slightly tensioned or sprung upwardly, so that they are slightly separated at the tips. This setting of the pen point is a delicate operation in the assembling of the pen, and involves very accurate positioning of the pen point and feed bar.

It frequently occurs, incident to use of the pen, that the proper set of the nibs is destroyed. This may occur through habitual writing with the pen in a laterally canted position, as a result of which the nibs are subjected to unequal pressures or more or less lateral pressures. Sometimes it may be caused by writing with the pen point in an inverted position, as is sometimes done in manifolding with carbon paper. Sometimes the set is destroyed by slight distortion of the pen point or of the feed bar due to temperature changes or internal strains in the material of which they are made.

One of the objects of the present invention is the provision of an improved pen point construction, particularly adapted to use in fountain pens but not limited thereto for its advantages, which will be effective to maintain a properly spaced relationship of the tips of the nibs for obtaining the effect above indicated, entirely independently of associated parts such as the feed bar.

Another object is the provision of such a pen point which is adapted to function properly in a fountain pen without involving the accurate setting of the pen in the particulars above mentioned.

Another object is the provision of a pen point having the attributes just specified and which may be manufactured with the desired accuracy in a comparatively simple manner.

Yet another object is the provision of an improved pen point construction which will maintain the desired tension of the nibs without subjecting their delicate tips to distortion.

A further object is the provision of an improved pen point construction which will very largely eliminate likelihood of distortion and overlapping of the nibs from lateral pressure in writing.

Still another object is the provision of an improved pen point construction in which the flexibility of the nibs may be varied selectively without varying the relationship of the nib tips consequent upon slight structural deformation of the pen point.

Other and further objects will be pointed out or indicated hereinafter, or will be apparent to one skilled in the art upon an understanding of the invention or its use in practice.

For the purpose of aiding in an explanation of the invention, I show in the accompanying drawing forming a part of this specification, and hereinafter describe, certain pen point constructions in which it is embodied in different forms. It is to be understood, however, that these are presented merely for purpose of illustration and are not to be regarded as exhaustive of all of the possible structural forms in which the invention may be embodied, and are not to be construed in any fashion calculated to limit the appended claims short of the true and most comprehensive scope of the invention in the art.

In this drawing,

Fig. 1 is a top view of a portion of a pen point embodying the invention in one form;

Fig. 2 is a bottom view of the same embodiment;

Fig. 3 is a sectional view on approximately line 3—3 of Fig. 2;

Fig. 4 is an end view looking at the tip ends of the nibs;

Fig. 5 is a side view of the embodiment illustrated in Figs. 1 and 2;

Fig. 6 is a bottom view of a portion of a pen point embodying the invention in another form;

Fig. 7 is a section on line 7—7 of Fig. 6; and

Fig. 8 is a top view of a pen point containing the embodiment shown in Fig. 6 and features for effecting selective variation of the flexibility of the nibs.

Described generally, the invention provides a pen point having collaterally arranged resilient nibs which terminate in writing tips, said nibs being separated by an intervening slit leading from a pierce in the body of the pen point at the upper ends of the nibs. The nibs have portions which contact each other at a slight distance from the writing tip under the inherent resiliency or tension of the nibs, while at the tip, and for a slight distance upwardly therefrom, the nibs are spaced apart from each other to afford a narrow ink-holding slot or crevice. The tips are prevented, by their mutual contact above such slot, against closing together, and are formed to provide an ink-conducting channel past their mutually contacting portions, to accommodate and induce flow of ink to the tip slot from the portion of the slit above the mutually contacting portions. By such construction, the nib tips are maintained in properly spaced relationship while at the same time the nibs may have the desired inherent inward or downward tension.

The invention will be understood in more detail from the illustrative embodiments shown in the drawing, which will now be described.

In the embodiment illustrated in Figs. 1 to 5 inclusive, the pen point has a body portion 10 of more or less conventional form, which is raised in arched contour, the nibs 11 being formed integrally therewith and tapering to narrow writing tips 12. The body is formed with the pierce 14 from which the slit 15 leads to the tip. The end portions of the nibs may be formed of a suitable wear-resistant material, such as iridium, welded to the body material as along the juncture line 16.

The slit 15 preferably tapers or converges from the pierce 14 to a location slightly above the writing tip, at which location the nibs contact each other laterally as at 17. The nibs have the desired inherent resiliency and an inherent tension or set whereby they maintain themselves in contact with each other at location 17. At the tip of the pen point, and for a slight distance upwardly therefrom, the adjacent margins of the nibs are cut away so as to afford a tip slot 18, the margins of the nibs which define this slot being approximately parallel. Due to the abutment of the nib margins at location 17, the tips are prevented from closing against each other, the tip slot 18 thus being maintained as a crevice or clearance between them. This clearance preferably is extremely slight, e. g., .001 to .002 of an inch, but is adequate to retain, by capillary action, a flowable quantity of ink. The tips are ground so as to debouch this clearance on smoothly curving lines, as indicated at 12a in Fig. 2, and they are somewhat thicker than the body material and smoothly rounded off on their lower and upper surfaces, to form a writing point substantially as illustrated in Figs. 4 and 5. This formation may be such as to provide a relatively wider ink-applying surface on the under side of the tip, as indicated at 19 in Fig. 4, and a relatively narrower ink-applying surface on the upper side, as indicated at 20. This is to permit use of the pen in either the normal or the inverted position, with production of a finer line in the latter.

As seen in Figs. 2 and 3, the adjacent marginal portions of the nibs are chamfered or beveled off on their under sides, as indicated at 21, to form a channel 22 running along the medial slit. This channel extends past and both forwardly and rearwardly beyond the nib contact area 17, and serves as a communicating passageway for ink from the open portion of the slit 15 to the tip slot 18, and it preferably extends to the welded-on portions of the tip, when such are employed.

Depending on the flexibility of the nibs and the amount of pressure exerted upon the pen by the user, the nibs may be spread or separated more or less in the use of a pen in writing, or the nibs may not be spread or separated in the contact area 17 at all. In whichever way the pen is used, however, the construction affords a continuous and effective channel for flow of ink to the writing tip where it contacts the paper, and, when the writing is discontinued, the tip slot 18 retains an appreciable quantity of ink immediately at the writing point so that ink will be deposited on the paper immediately the tip is again applied thereto.

The embodiment illustrated in Figs. 6 and 7 is one wherein the same effects and advantages are attained, but which can be manufactured by operations which are simpler and more easily controlled for accurate results. In these figures the reference numerals used in the preceding figures are applied to corresponding parts. In the forming of a pen point of this construction the medial slit 15' may be made in uniform width throughout its length, thus simplifying the slitting operation. This slit is of the width desired for the clearance between the nib tips. The contact areas of the nibs are formed by a staking operation by which portions of the material at the upper side of the nibs are displaced inwardly to provide lands 24 which contact each other. These are located a slight distance above the ends of the tips, and maintain the nibs spaced apart in the desired relationship. The portions of the material under the lands are not displaced, thus leaving a channel 25 as a connection between the rearward and forward portions of the open slit 15', said forward portion constituting the ink-retaining slot between the tips of the nibs.

It will be understood that in the drawing the width of the tip slots is somewhat exaggerated in proportion to the size of the pen point, for purpose of clarity of illustration.

In Fig. 8 is illustrated a pen point having the features of construction illustrated in Figs. 6 and 7 and equipped also with means for accomplishing a selective variation in the flexibility of the nibs. This adjusting means constitutes the subject matter of the patent to Robert Back No. 1,980,159, granted November 6, 1934 to the assignee of this present invention. In addition to having the nibs formed and positioned as above described, this pen point is provided with parallel slots 26 which extend for a distance in the body portion 10 and forwardly into the nibs on opposite sides of the medial slit. An adjusting member 27, of relatively stiff or rigid quality, fits upon the upper surface of the pen point and has downwardly extending lugs 28 fitting slidably in said slots, the lower portions of the lugs being bent outwardly below the pen point to hold the adjusting member thereto. The adjusting member has a converging nose portion 27a which extends forwardly from the lugs and also rides in contact with the upper surface of the nibs. The adjusting member may be slid forwardly or rearwardly on the pen point, the lugs riding in the slots 26, and it has a detent portion adapted to engage in any of a series of seats 29 formed on the upper surface of the pen point, for the purpose of retaining the adjusting member in the selected position. The nose 27a and lugs 28 impose limitations on the flection of the nibs, and by moving the adjusting member forwardly toward the tips of the nibs, the proportion of the nibs susceptible of flection may be reduced as desired. In dotted lines is shown the forward limit position of the nose 27a of the adjusting member. The provision of the lands 24 for holding the nib tips spaced apart has a definite cooperation with this adjusting means, in that it prevents the nib tips from being forced together even though the slots 26 may not be exactly parallel or even though there may be some distortion of the nibs from internal strains or other causes. It will be obvious that the nib construction illustrated in Figs. 1 to 4 inclusive, as well as others within the scope of the invention, may be utilized in combination with the adjusting means.

In either of the nib constructions above described it is desirable that the contact areas of the nibs extend for an appreciable distance in the direction of the nibs' thickness, thus to maintain the proper contact even though one of the nibs may be flexed upwardly somewhat more than the other under a writing pressure which is insufficient to separate the nibs laterally. Whether or not the nibs are completely separated in the writing operation, the provision of the channel beneath the contact area affords a suitable feed of ink to the writing tip. It will also be appreciated that the present invention obviates the necessity for extreme accuracy in the set of the pen point relative to the feed bar in a fountain pen necessary to obtain immediate ink flow at the writing tip, and that consequently it is adapted to function satisfactorily in spite of the influences which are likely to affect the performance of a fountain pen adversely in the course of its use.

What I claim is:

1. A pen point comprising a body portion formed with collaterally associated resiliently flexible nibs which terminate in writing tips which are slightly spaced apart laterally from each other to afford a slot between them, the nibs having lateral contact with each other above said slot to keep the tips spaced apart when the nibs are at their normal tension.

2. A pen point comprising a body portion formed with collaterally associated resiliently flexible nibs which are separated from each other by a medial slit, said nibs terminating in writing tips which are spaced apart laterally from each other to afford an intervening slot, the nibs having lateral contact with each other for only a fraction of the length of the slit, their area of contact terminating a short distance rearwardly from the tips.

3. A pen point as specified in claim 2 and wherein the nibs are formed to afford a longitudinal channel past their area of contact and communicating with the slit and the slot.

4. A pen point as specified in claim 2 and wherein the nibs are formed to afford a longitudinal channel passing under their area of contact and communicating with the slit and the slot.

5. A pen point comprising a body portion formed with collaterally associated resilient nibs which are separated from each other by a medial slit, said nibs terminating in writing tips, portions of said nibs being offset laterally toward each other and contacting for only a small fraction of the length of the slit, the portions of the nibs forwardly of said offset portions being laterally spaced apart from each other.

6. A pen point as specified in claim 5 and wherein the nibs are formed to afford a longitudinal channel past said offset portions and communicating with the slit rearwardly and forwardly thereof.

7. A pen point comprising a body portion formed with collaterally associated resilient nibs which are separated from each other by a medial slit, said nibs terminating in writing tips, portions of said nibs being offset laterally toward each other and contacting for only a small fraction of the length of the slit, the portions of the nibs rearwardly and forwardly of said offset portions being laterally spaced apart from each other.

8. A pen point as specified in claim 7 and wherein the nibs are formed to afford a longitudinal channel past said offset portions and communicating with the slit rearwardly and forwardly thereof.

9. A pen point comprising a body portion formed with collaterally associated resilient nibs which terminate in writing tips, the nibs having lateral contact with each other for a fraction of their length but being laterally spaced apart at the tips and for a short distance rearwardly thereof, the body portion and nibs being provided with longitudinally extending slots spaced laterally from the medial slit, and a stiff adjusting member slidably mounted on the pen point and having lugs engaging in said slots, whereby the proportion of the nibs susceptible of outward flection may be selectively varied by adjustment of the adjusting member longitudinally of the pen point, the contacting portions of the nibs serving to keep the tips spaced apart from each other in all adjustments of the adjusting member.

10. A pen point comprising a body portion formed with collaterally associated resilient nibs which terminate in writing tips, an adjusting member adapted for cooperation with said nibs to hold portions of them against outward flection, said adjusting member being adjustable to vary the proportion of the nibs susceptible of outward flection, said nibs being laterally spaced apart at the tips and for a short distance rearwardly therefrom and being in lateral contact with each other for only a short fraction of the balance of their length, their contacting portions being at a short distance from the tips.

ARTHUR N. LUNGREN.